(12) United States Patent
Hamano et al.

(10) Patent No.: US 6,468,698 B1
(45) Date of Patent: *Oct. 22, 2002

(54) LITHIUM ION SECONDARY BATTERY AND METHOD OF FABRICATING THE SAME

(75) Inventors: Kouji Hamano; Sei Tsunoda; Yasuhiro Yoshida; Michio Murai; Takayuki Inuzuka; Shigeru Aihara; Hisashi Shiota, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,265

(22) Filed: Jan. 27, 1998

(30) Foreign Application Priority Data

Jan. 28, 1997 (JP) .............................................. 9-013932
Oct. 24, 1997 (JP) .............................................. 9-292438

(51) Int. Cl.$^7$ .......................... H01M 4/58; H01M 4/02; H01M 10/40
(52) U.S. Cl. ........................ 429/316; 429/94; 429/317; 29/623.4
(58) Field of Search .......................... 29/623.4; 429/316, 429/306, 317, 94

(56) References Cited

U.S. PATENT DOCUMENTS

| | | | |
|---|---|---|---|
| 5,437,692 A | | 8/1995 | Dasgupta et al. |
| 5,456,000 A | | 10/1995 | Gozdz et al. |
| 5,498,489 A | | 3/1996 | Dasgupta et al. |
| 5,512,389 A | * | 4/1996 | Dasgupta et al. |
| 5,681,357 A | * | 10/1997 | Eschbaua et al. ...... 29/623.4 X |
| 5,688,293 A | * | 11/1997 | Oliver et al. .......... 29/623.4 X |
| 5,716,421 A | * | 2/1998 | Pendalwar et al. .... 29/623.4 X |
| 5,741,609 A | * | 4/1998 | Chen et al. ............ 29/623.4 X |
| 5,853,916 A | * | 12/1998 | Venugopal et al. ..... 429/316 X |
| 6,306,540 B1 | | 10/2001 | Hiroi et al. |
| 6,322,599 B1 | | 11/2001 | Hamano et al. |

* cited by examiner

*Primary Examiner*—John S. Maples
(74) *Attorney, Agent, or Firm*—Oblon, Spivak, McClelland, Maier & Neustadt, P.C.

(57) ABSTRACT

To provide a practical thin type lithium ion secondary battery having a excellent safety and charge-discharge properties. A lithium ion secondary battery comprising a positive electrode 1, a negative electrode 4, a separator 7 retaining an electrolytic solution, and an adhesive resin layer 8 which connects said positive electrode 1 and negative electrode 4 to said separator 7, characterized in that said adhesive resin layer 8 comprises a polyvinylidene fluoride and an ionically-conducting polymer compound incorporated therein.

14 Claims, 3 Drawing Sheets

LITHIUM ION SECONDARY BATTERY AND METHOD OF FABRICATING THE SAME

BACKGROUND OF THE INVENTION

1. Field of the Invention

The present invention relates to a lithium ion secondary battery and a method of fabricating the same. More particularly, the present invention relates to a battery structure which can be in any form such as thin type battery.

2. Discription of the Related Art

There is a strong demand for the miniaturization and the reduction of weight of portable electronic apparatus. The accomplishment of this demand drastically depends on the enhancement of the battery properties. To this end, a variety of batteries have been developed, and the improvement of batteries have been under way. These batteries have requirements for high voltage use, large energy density, safety, arbitrariness in shape, etc. Lithium ion secondary batteries can be expected to have the highest voltage and energy density among various kinds of batteries and are still under extensive improvement.

A lithium ion secondary battery comprises as essential constituents a positive electrode, a negative electrode, and an ionically-conducting layer provided interposed between the positive electrode and the negative electrode. In lithium ion secondary batteries which have been put into practical use, as the positive electrode there is used one obtained by applying a positive electrode active material made of a powder of lithium-cobalt oxide or the like to a collector which is then formed into a tablet. As the negative electrode there is used one obtained by applying a negative electrode active material made of a powdered carbon-based material or the like to a collector which is then formed into a tablet. As the ionically-conducting layer there is used a porous film made of a polypropylene or the like impregnated with a nonaqueous electrolytic solution.

The state-of-the-art lithium ion secondary batteries comprise a casing made of a metal or the like. Without any casing, it is difficult to keep the connection of the ionically-conducting layer to the positive and negative electrodes, and the resulting peeling of these components off the connection leads to deterioration of battery properties. However, the foregoing casing adds to the weight of the lithium ion secondary battery, making it difficult to reduce the size and weight of the lithium ion secondary battery. At the same time, the rigidity of the foregoing casing makes it difficult to form the battery into an arbitrary shape.

For the purpose of reducing the weight and thickness of lithium ion secondary batteries, batteries requiring no rigid casing are now under extensive study. In order to accomplish this object, it is necessary that the connection of the positive and negative electrodes to the ionically-conducting layer be kept even under no external force.

As an approach concerning the foregoing requirement, a structure having electrodes formed by adhering active materials with an electronically-conducting polymer, said electrodes being connected to each other with a polymer electrolytic solution, or a structure having electrodes and a separator connected to each other with a liquid adhesive mixture is disclosed in U.S. Pat. No. 5,437,692. Further, a method which comprising the formation of an ionically-conducting layer by a gel electrolytic solution is disclosed in WO95/15,589.

However, the approach disclosed in the above cited U.S. Pat. No. 5,437,692 is disadvantageous in that sufficient adhesive strength cannot be obtained, making it impossible to thoroughly reduce the battery thickness, and the ionic conducting resistivity between the ionically-conducting layer and the electrode is too large to give practically sufficient charge-discharge properties. The approach disclosed in the above cited WO95/15,589 is disadvantageous in that the ionically-conducting layer to be connected is plastic, making it impossible to obtain a sufficient adhesive strength and hence thoroughly reduce the battery thickness.

SUMMARY OF THE INVENTION

An object of the present invention is to solve the foregoing problems and provide a thin lithium ion secondary battery excellent in properties such as charge-discharge characteristics by securing the desired adhesive strength and ionic conduction between the ionically-conducting layer and the electrodes at the same time.

A first aspect of the lithium ion secondary battery of the present invention is a battery which comprises a positive electrode, a negative electrode, an electrolyte, and an adhesive resin layer which bonds each of said positive electrode and negative electrode to said electrolyte, wherein said adhesive resin layer contains an ionically-conducting polymer compound incorporated therein.

A second aspect of the lithium ion secondary battery is a battery according to the first aspect of the present invention, wherein an average molecular weight of said ionically-conducting polymer compound is in a range between 10000 and 1000000.

A third aspect of the lithium ion secondary battery is a battery according to the first aspect of the present invention, wherein said adhesive resin layer contains 20~90 weight % of ionically-conducting polymer compound.

A fourth aspect of the lithium ion secondary battery is a battery according to the first aspect of the present invention, wherein said adhesive resin layer contains 40~80 weight % of ionically-conducting polymer compound.

A fifth aspect of the lithium ion secondary battery is a battery according to the first aspect of the present invention, wherein said adhesive resin layer contains a polyvinylidene fluoride and ionically-conducting polymer compound incorporated therein.

A sixth aspect of the lithium ion secondary battery is a battery according to the first aspect of the present invention, wherein said adhesive resin layer contains a polyvinyl alcohol and an ionically-conducting polymer compound incorporated therein.

A seventh aspect of the lithium ion secondary battery is a battery according to the first aspect of the present invention, wherein said electrolyte is constituted by a separator retaining an electrolytic solution.

A eighth aspect of the lithium ion secondary battery is a battery according to the first aspect of the present invention, wherein said electrolyte is constituted by a solid electrolyte.

A ninth aspect of the lithium ion secondary battery is a battery according to the eighth aspect of the present invention, wherein said ionically-conducting polymer compound is constituted by a material different from said solid electrolyte.

A tenth aspect of the lithium ion secondary battery is a battery according to the first aspect of the present invention, wherein said ionically-conducting polymer compound is one containing one or more ethylene oxide units in the molecular structure.

A eleventh aspect of the lithium ion secondary battery is a battery according to the first aspect of the present invention, wherein said ionically-conducting polymer compound comprises at least one of a poly(alkylester acrylate) and poly(alkylester methacrylate).

A twelfth aspect of the lithium ion secondary a battery is a battery according to the first aspect of the present invention, wherein said ionically-conducting polymer compound comprises at least one of a poly(hydroxyalcoxyester acrylate), poly(hydroxyalcoxyester acrylate), poly(hydroxyalkylester methacrylate) and poly(hydroxyalcoxyester methacrylate).

Preferably another aspect of the lithium ion secondary battery is a battery according to the first aspect of the present invention, wherein said ionically-conducting polymer compound comprises at least two compounds selected from the group consisting of the following compounds (1), (2) and (3):

(1) Compound containing one or more ethylene oxide units in the molecular structure:
(2) Poly(alkylester acrylate) or poly(alkylester methacrylate); and
(3) Poly(hydroxyalkylester acrylate), poly(hydroxyalcoxyester acrylate), poly(hydroxyalkylester methacrylate) or poly(hydroxyalcoxyester methacrylate).

A thirteenth aspect of the lithium ion secondary battery is a battery according to the first aspect of the present invention, which comprises a plurality of electrode laminates having a positive electrode and a negative electrode bonded to an electrolyte through an adhesive resin layer containing an ionically-conducting polymer compound incorporated therein.

A fourteenth aspect of the lithium ion secondary battery is a battery according to the thirteenth aspect of the present invention, wherein said plurality of electrode laminates are arranged that said positive and negative electrodes are interposed alternately between plurality of cut electrolytes.

A fifteenth aspect of the lithium ion secondary battery is a battery according to the thirteenth aspect of the present invention, wherein said plurality of electrode laminates are arranged that said positive and negative electrodes are interposed alternately between wound plural electrolytes.

A sixteenth aspect of the lithium ion secondary battery is a battery according to the thirteenth aspect of the present invention, wherein said plurality of electrode laminates are arranged that said positive and negative electrodes are interposed alternately between folded plural electrolytes.

A seventeenth aspect of the lithium ion secondary battery is a battery according to the thirteenth aspect of the present invention, wherein said ionically-conducting polymer compound is one containing one or more ethylene oxide units in the molecular structure.

A eighteenth aspect of the lithium ion secondary battery is a battery according to the thirteenth aspect of the present invention, wherein said ionically-conducting polymer compound comprises at least one of a poly(alkylester acrylate) and poly(alkylester methacrylate).

A nineteenth aspect of the lithium ion secondary battery is a battery according to the thirteenth aspect of the present invention, wherein said ionically-conducting polymer compound comprises at least one of a poly(hydroxyalkylester acrylate), poly(hydroxyalcoxyester acrylate), poly(hydroxyalkylester methacrylate) and poly(hydroxyalcoxyester methacrylate).

Preferably another aspect of the lithium ion secondary battery is a battery according to the fourteenth aspect of the present invention, wherein said ionically-conducting polymer compound comprises at least two compounds selected from the group consisting of the following compounds (1), (2) and (3):

(1) Compound containing one or more ethylene oxide units in the molecular structure:
(2) Poly(alkylester acrylate) or poly(alkylester methacrylate); and
(3) Poly(hydroxyalkylester acrylate), poly(hydroxyalcoxyester acrylate), poly(hydroxyalkylester methacrylate) or poly(hydroxyalcoxyester methacrylate).

A twentieth aspect of the method of fabricating a lithium ion secondary battery is a method of the present invention, which comprises the steps of:
coating an adhesive resin layer on both surfaces of an electrolyte;
laminating a positive electrode and a negative electrode on the both surfaces of the electrolyte respectively to form a laminate.

DESCRIPTION OF THE PREFERRED EMBODIMENTS

The inventors made extensive studies of preferred method for connection of separator to electrode plate. As a result, the present invention has been worked out.

Figure 1:
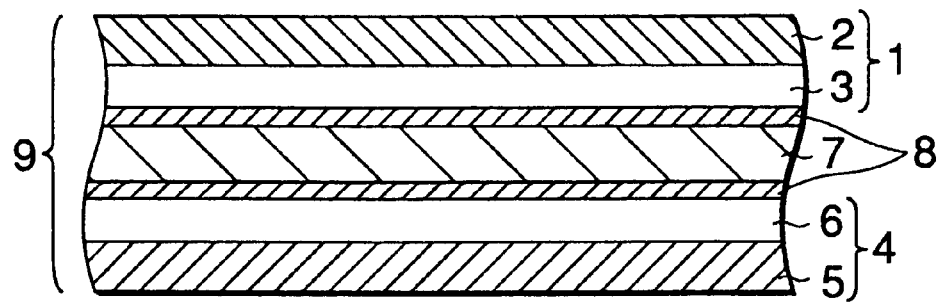
FIG. 1 is a sectional view of an essential part illustrating an embodiment of the lithium ion secondary battery according to the present invention.

In other words, the lithium ion secondary battery according to the present invention comprises as shown in FIG. 1 a positive electrode 1 having an positive electrode active material layer 3 provided on a positive electrode collector 2, a negative electrode 4 having a negative electrode active material layer 6 provided on a negative electrode collector 5, a separator 7 retaining an electrolytic solution, and an adhesive resin layer 8 which connects said positive electrode 1 and negative electrode 4 to said separator 7, characterized in that said adhesive resin layer 8 comprises a polyvinylidene fluoride and a compound containing an ionically-conducting polymer compound incorporated therein.

It goes without saying that the use of the separator 7 is intended to secure safety against internal shortcircuiting in the battery and the adhesion of the positive electrode 1 and negative electrode 4 to the separator 7 with the adhesive resin layer 8 is intended to secure its mechanical strength. The adhesive resin layer 8 can comprise a polyvinylidene fluoride or polyvinyl alcohol and an ionically-conducting polymer compound incorporated therein to exhibit a large ionic conductivity. In other words, the ionically-conducting polymer compound to be incorporated in the adhesive resin layer 8 is allowed to occur for the purpose of providing a large ionic conductivity essential for securing desired battery properties. The use of the polyvinylidene fluoride or polyvinyl alcohol is intended to secure the desired strength of adhesion of the positive electrode 1 and negative electrode 4 to the separator 7. Thus, the adhesive resin layer 8 can secure both large ionic conductivity and adhesive strength at the same time.

The polymer compound which serves as an adhesive as an essence of the present invention at least must be insoluble in the electrolytic solution and must undergo no reaction in the battery. Further, the polymer compound must secure both large adhesive strength and ionic conductivity at the same time.

We made extensive studies of adhesive strength. As a result, it was found that a fluororesin or a mixture comprising a fluororesin as a main component, a polyvinyl alcohol or a mixture comprising a polyvinyl alcohol as a main component is effective. Specific embodiments of such a compound employable herein include polymer or copolymer containing fluorine atom in its molecular structure such as vinylidene fluoride and ethylene tetrafluoride, polymer or copolymer containing vinyl alcohol in its molecular structure, and mixture thereof with methyl polymethacrylate, polystyrene, polyethylene, polypropylene, polyvinylidene chloride, polyvinylchloride, polyacrylonitrile, polyethylene oxide or the like. In particular, a polyvinylidene fluoride or polyvinyl alcohol having an average molecular weight (Mw) of from 100,00 to 1,000,000 is effective. And more preferably 100,000 to 1,000,000 is more effective. Further, the ionically-conducting polymer compound can be provided with desired properties without impairing the desired adhesive strength.

It was found that as the compound which can be used in combination with the foregoing polyvinylidene fluoride or polyvinyl alcohol there can be effectively used any of the following compounds containing one or more ethylene oxide units in the molecular structure with respect to ionic conductivity.

In some detail, simple aliphatic polyethers such as ethylene glycol, propylene glycol, diethylene glycol, dipropylene glycol, polyethylene glycol and polypropylene glycol may be used singly or in combination. Alternatively, compounds containing at least ethylene oxide group disclosed in U.S. Pat. Nos. 4,578,326, 4,579,793 and 4,620,944 may be used in the present invention.

Embodiments of compounds which can be used in combination with polyvinylidene fluoride to exert the same effect as the compound containing ethylene oxide group include homopolymers or copolymers of compounds such as poly(alkylester acrylate) and poly(alkylester methacrylate), e.g., poly(methyl acrylate), poly(methyl methacrylate), poly(ethyl acrylate), poly(ethyl methacrylate), poly(propyl acrylate), poly(propyl methacrylate), poly(isopropyl acrylate), poly(isopropyl methacrylate), poly(butyl acrylate), poly(butyl methacrylate), poly(isobutyl acrylate), poly(isobutyl methacrylate), poly(hexyl acrylate), poly (hexyl methacrylate). As a matter of course, crosslinked polymer compounds obtained by the copolymerization of monomers (prepolymers) and polyfunctional compounds of these compounds, e.g., ethylene glycol dimethacrylate, trimethylol propane triacrylate may be used in the present invention.

Further, the ionically-conducting polymer compound may be selected from the group consisting of poly (hydroxyalkylester acrylate), poly(hydroxyalcoxyester acrylate), poly(hydroxyalkylester methacrylate) and poly (hydroxyalcoxyester methacrylate). Embodiments of these compounds include poly(hydroxyethyl acrylate), poly (hydroxyethyl methacrylate), poly(hydroxypropyl acrylate), poly(hydroxypropyl methacrylate), poly(diethylene glycol monoacrylate), poly(diethylene glycol monomethacrylate), poly(dipropylene glycol monoacrylate), poly(dipropylene glycol monomethacrylate), poly(polyethylene glycol monoacrylate), poly(polyethylene glycol monomethacrylate), poly(polypropylene glycol monoacrylate), and poly(polypropylene glycol monomethacrylate). These compounds can be used in combination with the foregoing polyvinylidene fluoride to best advantage.

Moreover, the foregoing poly(hydroxyalkylester acrylate), poly(hydroxyalcoxyester acrylate), poly (hydroxyalkylester methacrylate) or poly (hydroxyalcoxyester methacrylate) can be used in combination with the foregoing compound containing ethylene oxide group or the foregoing poly(alkylester acrylate) or poly (alkylester methacrylate) to provide desirable results.

As the positive electrode active material layer 3 according to the present invention there may be used one comprising as an active material which is a oxide compound of transition metal such as cobalt, manganese and nickel, a chalcogen compound, a alcoxy compound thereof or various additive elements incorporated therein without any restriction. As the negative electrode active material layer 6 there may be preferably used a carbon-based material. In the battery of the present invention, any carbon-based material may be used regardless of its chemical characteristics. These active materials are used in particulate form. The particle diameter of the particulate active material may fall within a range of from 0.3 to 20 μm, particularly from 1 to 5 μm. In the case that the particle diameter is too small, the surface area of the particulate active material covered by the adhesive during adhesion is too large, reducing the efficiency in doping and release of lithium ion during charge-discharge and hence deteriorating the battery properties. On the other hand, in the case that the particle diameter is too large, the thickness of the active material layers 3 and 6 cannot be easily reduced and the packing density of active material is reduced. Further, since the active material layers 3 and 6 thus formed has a raised surface roughness, it cannot be fairly bonded to the separator 7.

As the positive electrode collector 2 and the negative electrode collector 5 constituting the positive electrode 1 and the negative electrode 4, respectively, there can be used any metal inert in the battery. In practice, however, aluminum and copper are preferably used as the positive electrode collector 2 and the negative electrode collector 5, respectively. The collectors 2 and 5 may be used in the form of foil, net, expanded metal or the like. In practice, they are preferably in the form of net, expanded metal or any other form having a large surface area because these forms give a large adhesive strength or facilitate the impregnation of the collector with the electrolytic solution after adhesion.

As the separator 7 there may be used any insulating porous membrane, net or unwoven cloth having a sufficient strength. Such a material is not specifically limited. In practice, however, a porous membrane made of polypropylene, polyethylene or the like is desirable from the standpoint of adhesivity and safety. If a fluororesin-based material is used, it may be necessary that its surface be plasma-treated to secure the required adhesive strength.

The electrolytic solution comprises as a solvent an ether solvent such as dimethoxyethane and diethylether or ester solvent such as ethylene carbonate and propylene carbonate, singly or in admixture. Embodiments of the electrolyte to be dissolved in the electrolytic solution include $LiPF_6$, $LiAsF_6$, $LiClO_4$, $LiBF_4$, $LiCF_3SO_3$, $Li(CF_3SO_2)_3$, $LiN(CF_3SO_2)_2$, and $LiN(C_2F_5SO_2)_2$.

As mentioned above, in accordance with the present invention, the positive electrode 1 and the negative electrode 4 are connected to the separator 7 to secure the desired adhesive strength and a large ionic conductivity. In this arrangement, the peeling of the positive electrode 1 and the negative electrode 4 off the separator 7, which is a disadvantage of the conventional batteries, can be prevented while providing a lithium ion secondary battery having excellent battery properties, particularly a large energy density.

Further, the foregoing structure requires no casing for maintaining the battery structure, making it possible to reduce the weight and thickness of the lithium ion battery.

Moreover, the large strength of adhesion between the separator 7 and the positive and negative electrodes 1 and 4 also gives a structure such that internal destruction takes place in the positive electrode 1 and the negative electrode 4 when the lithium ion secondary battery is acted upon by an external force that deforms the battery or an internal thermal stress. This exerts an effect of maintaining the safety of the battery.

An important effect of the present invention is to improve the charge-discharge properties of the battery. One of the important factors determining the charge-discharge efficiency of the battery is the magnitude of the resistivity across the electrodes. Thin batteries having the conventional structure comprise a gel electrolyte having an electrolytic solution retained by entanglement of polymer chains. However, when the ambient temperature rises, the electrolytic solution thus retained oozes out, possibly causing the peeling of the electrodes and the electrolyte and hence raising the resistivity across the electrodes. In accordance with the present invention, the incorporation of a polymer material having an ionically-conducting property prevents the electrolytic solution from oozing out even when the ambient temperature rises, making it possible to reduce the resistivity across the electrodes and hence resulting in the improvement of charge-discharge properties.

Figure 2:
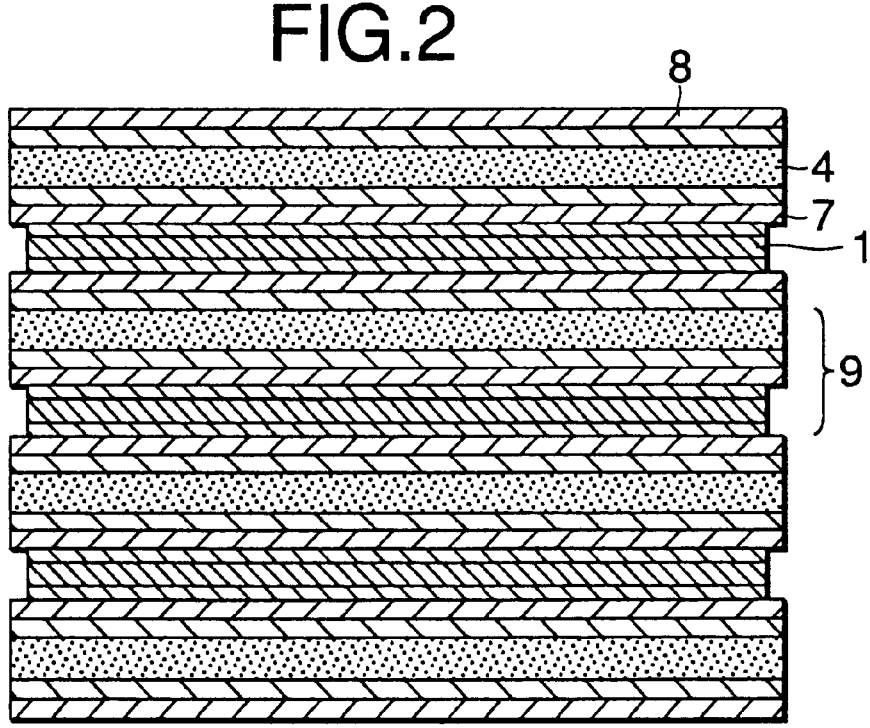
FIG. 2 is a sectional view of an essential part illustrating another embodiment of the lithium ion secondary battery according to the present invention.
Figure 3:
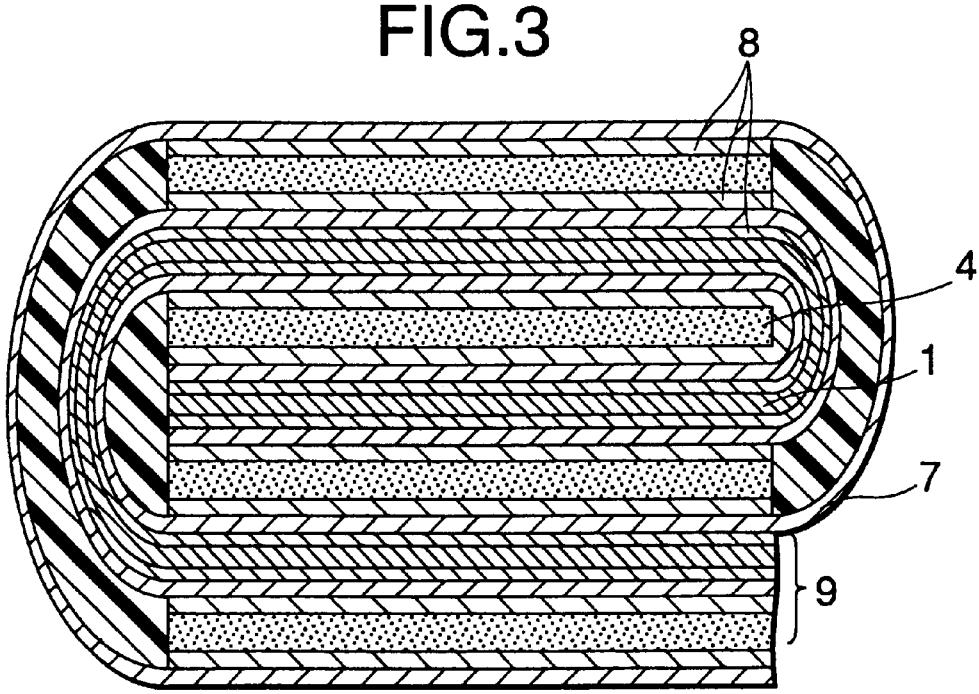
FIG. 3 is a sectional view of an essential part illustrating a further embodiment of the lithium ion secondary battery according to the present invention.
Figure 4:
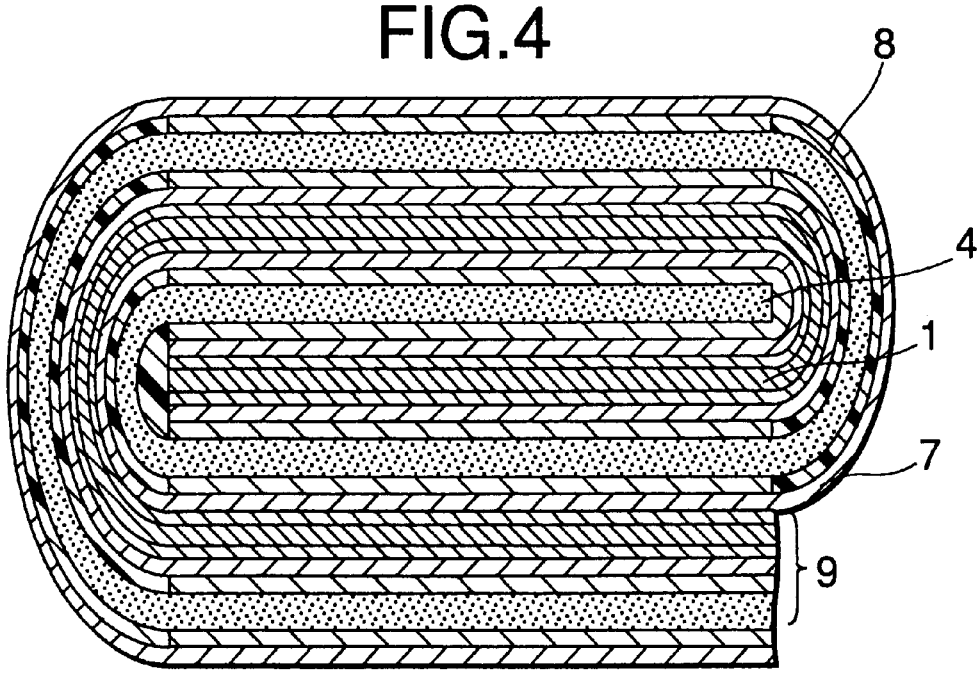
FIG. 4 is a sectional view of an essential part illustrating a still further embodiment of the lithium ion secondary battery according to the present invention.

The present invention has been described with reference to application to a single-layer electrode type battery comprising a single electrode laminate 9 having a positive electrode 1 and a negative electrode 4 connected to the respective side of a separator 7. However, the present invention can be applied to a structure comprising a plurality of electrode laminates 9 formed by alternately arranging a positive electrode 1 and a negative electrode 4 between separators 7 positioned apart therefrom as shown in FIG. 2. Alternatively, the present invention can be applied to a structure comprising a plurality of electrode laminates formed by winding a separator 7 with a positive electrode 1 and a negative electrode 4 alternately arranged in the gap thus formed as shown in FIGS. 3 and 4. Further, a positive electrode 1 and a negative electrode 4 may be arranged between the gap formed by folding a separator 7. In this arrangement, a laminated electrode type battery having a plurality of electrode laminates 9 can be provided which exhibits a capacity than increases in proportion to the number of laminates.

In accordance with the present invention, the desired adhesive strength and large ionic conductivity can be secured. In this arrangement, a compact excellent performance laminated electrode type battery having a large capacity can be provided without the necessity of a rigid casing even if used in the foregoing laminated form.

[Embodiment]

The present invention will be further described in the following embodiments with reference to lithium ion secondary batteries of the present invention shown in FIGS. 1 to 4.

Embodiment 1

(Preparation of Positive Electrode)

87 parts by weight of $LiCoO_2$, 8 parts by weight of powdered graphite and 8 parts by weight of a polyvinylidene fluoride were dispersed in N-methylpyrrolidone (hereinafter referred to as "NMP") to prepare an positive electrode active material paste. The positive electrode active material paste thus prepared was then formed into a thin active material layer having a thickness of 300 μm by a doctor blade coating method. On the top of the thin active material layer thus formed was then placed an aluminum net having a thickness of 30 μm as a positive electrode collector. Onto the top of the aluminum net was then coated the positive electrode active material paste to a thickness of 300 μm by a doctor blade coating method. The coated material was then allowed to stand in a 60° C. drier for 60 minutes so that it was half-dried to form a laminate of a positive electrode collector 2 and an active positive electrode. The laminate was then rolled to a thickness of 400 μm to prepare a positive electrode 1 comprising an positive electrode active material layer 3 formed thereon. The positive electrode 1 was dipped in an electrolytic solution, and then measured for peel strength of the positive electrode active material layer 3 with respect to the positive electrode collector 2. The results were from 20 to 25 gf/cm.

(Preparation of Negative Electrode)

95 parts by weight of mesophase microbead carbon (available from OSAKA GAS CO., LTD.) and 5 parts by weight of a polyvinylidene fluoride were dispersed in NMP to prepare an negative electrode active material paste. The negative electrode active material paste thus prepared was then formed into a thin negative electrode active material layer having a thickness of 300 μm by a doctor blade coating method. On the top of the thin negative electrode active material layer thus formed was then placed a copper net having a thickness of 20 μm as a negative electrode collector. Onto the top of the copper net was then coated the negative electrode active material paste to a thickness of 300 μm by a doctor blade coating method. The coated material was then allowed to stand in a 60° C. drier for 60 minutes so that it was half-dried to form a laminate of a negative electrode collector 5 and an negative electrode active. The laminate was then rolled to a thickness of 400 μm to prepare a negative electrode 4 comprising an negative electrode active material layer 6 formed thereon.

The negative electrode 4 was dipped in an electrolytic solution, and then measured for peel strength of the negative electrode active material layer 6 with respect to the negative electrode collector 2. The results were from 10 to 15 gf/cm.

(Preparation of Adhesive)

A mixture of 3.0 parts by weight of a polyethylene glycol having an average molecular weight (Mw) of 10,000 (available from Aldrich Inc.), 2.0 parts by weight of a polyvinylidene fluoride having an average molecular weight (Mw) of 534,000 and 95 parts by weight of NMP was thoroughly stirred to obtain a homogeneous solution. Thus, a viscous adhesive was prepared.

(Preparation of Battery)

The foregoing adhesive was applied to the both sides of a porous polypropylene sheet (Cellguard #2400, available from Hoext Inc.) as a separator 7. Thereafter, the foregoing positive electrode 1 and negative electrode 4 were applied to the separator 7 before the drying of the adhesive in such an arrangement that the two electrodes were opposed to each other with the separator 7 provided interposed therebetween to connect the positive electrode 1 and the negative electrode 4 to the separator 7. Thus, a battery laminate was prepared. The battery laminate thus prepared was then allowed to stand in a 60° C. hot air drier for 2 hours to allow NMP to evaporate. After NMP was completely evaporated, an electrolytic solution obtained by dissolving $LiPF_6$ in a 1:1 (molar ratio) mixture of ethylene carbonate (available from Kanto Chemical Co., Ltd.) and 1,2-dimethoxyethane (available from Wako Pure Chemical Industries, Ltd.) in an amount of 1.0 $mol/dm^3$ was injected into the battery laminate at room temperature.

Subsequently, the battery laminate was measured for adhesive strength of the positive electrode active material layer 3 and the negative electrode active material layer 6 with respect to the separator 7 at this stage. The results were from 25 to 30 gf/cm and from 15 to 20 gf/cm, respectively. The battery laminate into which the electrolytic solution had been injected was packaged with an aluminum-laminated film, and then sealed by heat fusion to obtain a lithium ion secondary battery.

Embodiment 2

The preparation procedure of Embodiment 1 was followed except that only the process for the preparation of the adhesive was changed. Thus, a lithium ion secondary battery was prepared.
(Preparation of Adhesive)

A mixture of 1.5 parts by weight of a polyethylene glycol having an average molecular weight (Mw) of 70,000 (available from Wako Pure Chemical Industries, Ltd.), 1.5 parts by weight of a polyethylene glycol having an average molecular weight (Mw) of 6,000 (available from Wako Pure Chemical Industries, Ltd.), 2.0 parts by weight of a polyvinylidene fluoride having an average molecular weight (Mw) of 534,000 (available from Aldrich Inc.) and 95 parts by weight of NMP was thoroughly stirred to obtain a homogeneous solution. Thus, a viscous adhesive was prepared.

Embodiment 3

The preparation procedure of Embodiment 1 was followed except that only the process for the preparation of the adhesive was changed. Thus, a lithium ion secondary battery was prepared.
(Preparation of Adhesive)

A mixture of 2.5 parts by weight of a polypropylene glycol diol having an average molecular weight (Mw) of 3,000 (available from Wako Pure Chemical Industries, Ltd.), 2.5 parts by weight of a polyvinylidene fluoride having an average molecular weight (Mw) of 534,000 (available from Aldrich Inc.) and 95 parts by weight of NMP was thoroughly stirred to obtain a homogeneous solution. Thus, a viscous adhesive was prepared.

Embodiment 4

The preparation procedure of Embodiment 1 was followed except that only the process for the preparation of the adhesive was changed. Thus, a lithium ion secondary battery was prepared.
(Preparation of Adhesive)

A mixture of 3.0 parts by weight of a poly(methyl methacrylate) having an average molecular weight (Mw) of 350,000 (available from Aldrich Inc.), 2.0 parts by weight of a polyvinylidene fluoride having an average molecular weight (Mw) of 534,000 (available from Aldrich Inc.) and 95 parts by weight of NMP was thoroughly stirred to obtain a homogeneous solution. Thus, a viscous adhesive was prepared.

Embodiment 5

The preparation procedure of Embodiment 1 was followed except that only the process for the preparation of the adhesive was changed. Thus, a lithium ion secondary battery was prepared.
(Preparation of Adhesive)

A mixture of 2.5 parts by weight of a poly(ethyl acrylate) having an average molecular weight (Mw) of 95,000 (available from Aldrich Inc.), 2.5 parts by weight of a polyvinylidene fluoride having an average molecular weight (Mw) of 534,000 (available from Aldrich Inc.) and 95 parts by weight of NMP was thoroughly stirred to obtain a homogeneous solution. Thus, a viscous adhesive was prepared.

Embodiment 6

The preparation procedure of Embodiment 1 was followed except that only the process for the preparation of the adhesive was changed. Thus, a lithium ion secondary battery was prepared.
(Preparation of Adhesive)

5 parts by weight of 2-hydroxyethyl acrylate (available from Wako Pure Chemical Industries, Ltd.), 0.05 parts by weight of 2,2'-azobis(isobutylonitrile) (available from Wako Pure Chemical Industries, Ltd.) and 94.95 parts by weight of benzene (available from Wako Pure Chemical Industries, Ltd.) were charged into a four-necked flask. The contents of the flask were heated with stirring at the reflux temperature of benzene for 1 hour to cause the polymerization of 2-hydroxyethyl acrylate. Benzene was then allowed to evaporate from the polymer solution to obtain a solid poly(2-hydroxyethyl acrylate).

A mixture of 3.0 parts by weight of the foregoing poly (2-hydroxyethyl acrylate), 2.0 parts by weight of a polyvinylidene fluoride having an average molecular weight (Mw) of 534,000 (available from Aldrich Inc.) and 95 parts by weight of NMP was thoroughly stirred to obtain a homogeneous solution. Thus, a viscous adhesive was prepared.

Embodiment 7

The preparation procedure of Embodiment 6 was followed except that 2-hydroxyethyl methacrylate (available from Wako Pure Chemical Industries, Ltd.) was used instead of 2-hydroxyethyl acrylate. Thus, a solid poly(2-hydroxyethyl methacrylate) was obtained.

The solid poly(2-hydroxyethyl methacrylate) thus obtained was then processed in the same manner as in Embodiment 6 to prepare an adhesive. Using the adhesive thus prepared, a lithium ion secondary battery was prepared in the same manner as in Embodiment 1.

Embodiment 8

The preparation procedure of Embodiment 6 was followed except that a poly(ethylene glycol) methacrylate having an average molecular weight of 360 (available from Aldrich Inc.) was used instead of 2-hydroxyethyl acrylate. Thus, a solid poly[poly(ethylene glycol) methacrylate] was obtained.

A mixture of 3.0 parts by weight of the foregoing solid poly[poly(ethylene glycol) methacrylate], 2.0 parts by weight of a polyvinylidene fluoride having an average molecular weight (Mw) of 534,000 (available from Aldrich Inc.) and 95 parts by weight of NMP was then processed in the same manner as in Embodiment 6 to prepare an adhesive. Using the adhesive thus prepared, a lithium ion secondary battery was prepared in the same manner as in Embodiment 1.

Embodiment 9

The preparation procedure of Embodiment 6 was followed except that a poly(propylene glycol)methylether acrylate having an average molecular weight of 260 (available from Aldrich Inc.) was used instead of 2-hydroxyethyl acrylate. Thus, a solid poly[poly(propylene glycol) methylether acrylate] was obtained.

A mixture of 3.0 parts by weight of the foregoing solid poly[poly(propylene glycol)methylether acrylate], 2.0 parts by weight of a polyvinylidene fluoride having an average molecular weight (Mw) of 534,000 (available from Aldrich Inc.) and 95 parts by weight of NMP was then processed in the same manner as in Embodiment 6 to prepare an adhesive. Using the adhesive thus prepared, a lithium ion secondary battery was prepared in the same manner as in Embodiment 1.

Embodiment 10

The preparation procedure of Embodiment 1 was followed except that only the process for the preparation of the adhesive was changed. Thus, a lithium ion secondary battery was prepared.

(Preparation of Adhesive)

A mixture of 1.5 parts by weight of a polypethylene glycol having an average molecular weight (Mw) of 70,000 (available from Wako Pure Chemical Industries, Ltd.), 1.5 parts by weight of a polyethylene glycol having an average molecular weight (Mw) of 6,000 (available from Wako Pure Chemical Industries, Ltd.), 2.0 parts by weight of a polyvinyl alcohol having an average molecular weight (Mw) of 534,000, and 95 parts by weight of NMP was thoroughly stirred to obtain a homogeneous solution. Thus, a viscous adhesive was prepared.

Embodiment 11

The preparation procedure of Embodiment 1 was followed except that only the process for the preparation of the adhesive was changed. Thus, a lithium ion secondary battery was prepared.

(Preparation of Adhesive)

A mixture of 1.5 parts by weight of a polypethylene glycol having an average molecular weight (Mw) of 70,000 (available from Wako Pure Chemical Industries, Ltd.), 1.5 parts by weight of a polyethylene glycol having an average molecular weight (Mw) of 6,000 (available from Wako Pure Chemical Industries, Ltd.), 2.0 parts by weight of a 9:1 (by weight) mixture of a polyvinyl alcohol having an average molecular weight (Mw) of 534,000 and a polyvinylidene fluoride and 95 parts by weight of NMP was thoroughly stirred to obtain a homogeneous solution. Thus, a viscous adhesive was prepared.

Embodiment 12

A negative electrode, a positive electrode, and an adhesive were prepared in the same manner as in Embodiment 1. The adhesive thus prepared was then applied to one side of two sheets of separators. The two sheets of separators were laminated with each other with the coated surfaces thereof being opposed to each other and the negative electrode being interposed therebetween. The laminate thus prepared was then allowed to stand in a 60° C. drier for 2 hours to allow NMP to evaporate.

A section having a predetermined size was stamped out from the separator laminate having a negative electrode interposed therebetween. The adhesive prepared as above was then applied to one side of the separator laminate thus stamped. Onto the coated surface of the separator laminate was then laminated the positive electrode which had been stamped out to a predetermined size. The adhesive prepared as above was then applied to one side of another sheet of the separator which had been stamped out to a predetermined size. The separator was then laminated with the foregoing laminate in such an arrangement that the coated surface thereof was opposed to the positive electrode side of the laminate. This procedure was repeated to form a battery body comprising plurality of electrode laminates. The battery body thus formed was then dried under pressure to prepare a flat laminated battery body as shown in FIG. 2.

An electrolytic solution was then injected into the flat laminated battery body thus prepared in the same manner as in Embodiment 1, and then sealed to obtain a lithium ion secondary battery.

In the present embodiment, a procedure may be repeated which comprises applying an adhesive to a separator laminate obtained by laminating two sheets of separators with a positive electrode interposed therebetween in the same manner as mentioned above, laminating a negative electrode with the separate laminate on the coated surface thereof, and then laminating another separator laminate with the foregoing laminate on the negative electrode side thereof.

Embodiment 13

A negative electrode, a positive electrode, and an adhesive were prepared in the same manner as in Embodiment 1. The adhesive prepared as above was then applied to one side of two sheets of belt-like separators. The two sheets of separators were laminated with each other with the coated surface thereof being opposed to each other and the positive electrode being interposed therebetween. The laminate thus prepared was then allowed to stand in a 60° C. drier for 2 hours to allow NMP to evaporate.

The adhesive prepared as above was then applied to one side of the belt-like separator laminate comprising a positive electrode interposed therebetween. The separator was then folded back by a predetermined amount. The negative electrode was then clamped by the folding part of the separator. The laminate was then passed through a laminator. Subsequently, the adhesive prepared as above was applied to the other side of the belt-like separator laminate. Another sheet of the negative electrode was then laminated with the separator laminate on the coated surface thereof in such an arrangement that it opposes to the foregoing negative electrode clamped by the folding part of the separator. The separator laminate with one of the two sheets of the negative electrode was wound into an ellipsoidal form while being laminated with the other sheet of the negative electrode. This winding procedure was repeated to form a battery body comprising a plurality of electrode laminates. The battery body thus formed was then dried under pressure to prepare a flat wound laminated battery body as shown in FIG. 3.

An electrolytic solution was then injected into the flat wound laminated battery body thus prepared in the same manner as in Embodiment 1, and then sealed to obtain a lithium ion secondary battery.

The present embodiment has been described with reference to a procedure which comprises winding of a laminate of belt-like separators comprising a belt-like positive electrode connected interposed therebetween while a negative electrode being laminated thereon. However, a procedure may be used which comprises winding of a laminate of belt-like separators comprising a belt-like negative electrode connected interposed therebetween while a positive electrode being laminated thereon.

The present embodiment has been described with reference to a procedure which comprising winding a separator. However, a procedure may be used which comprises folding of a laminate of belt-like separators comprising a belt-like negative or positive electrode connected interposed therebetween while a positive or negative electrode being laminated thereon.

Embodiment 14

A negative electrode, a positive electrode, and an adhesive were prepared in the same manner as in Embodiment 1.

A belt-like positive electrode was then arranged interposed between two sheets of belt-like separators. A belt-like negative electrode was placed on the outer surface of one of the two separators in such an arrangement that it protruded from the edge of the separator by a predetermined amount. The adhesive prepared as above was then applied to the inner surface of the separators and the outer surface of the separator on which the negative electrode had been placed. The positive electrode, the two sheets of separators and the negative electrode were then laminated. The laminate was then passed through a laminator. Subsequently, the adhesive prepared as above was applied to the outer surface of the other separator. The protruding negative electrode was folded and laminated onto the coated surface of the other separator. The separator laminate was then wound into an ellipsoidal form in such an arrangement that the negative electrode thus folded was wrapped thereinside to form a battery body comprising a plurality of electrode laminates. The battery body thus formed was then dried under pressure to prepare a flat wound laminated battery body as shown in FIG. 4.

An electrolytic solution was then injected into the flat wound laminated battery body thus prepared in the same manner as in Embodiment 1, and then sealed to obtain a lithium ion secondary battery.

The present embodiment has been described with reference to a procedure which comprises winding of a belt-like separator laminate comprising a belt-like positive electrode interposed therebetween and a belt-like negative electrode arranged on the outer surface of one of the two separators. However, a procedure may be used which comprises winding of a belt-like separator laminate comprising a belt-like negative electrode interposed therebetween and a belt-like positive electrode arranged on the outer surface of one of the two separators.

Embodiment 15

Figure 5:
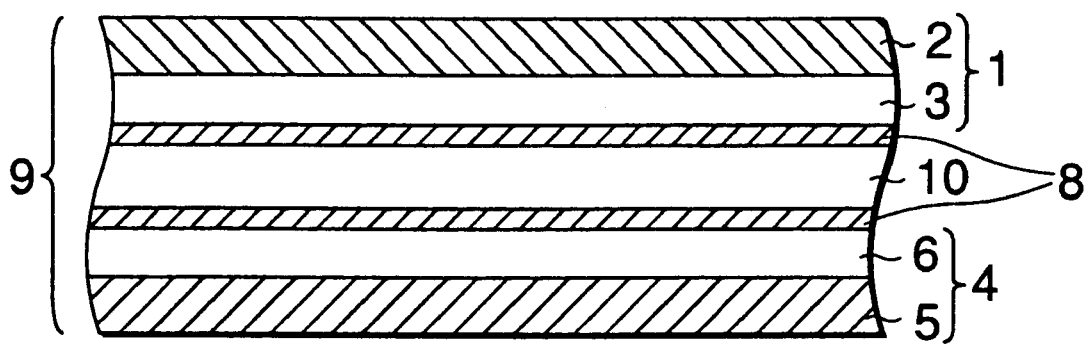
FIG. 5 is a sectional view of an essential part illustrating a still further embodiment of the lithium ion secondary battery according to the present invention.

The present embodiment is characterized in that solid electrolyte is used instead of separator retaining an electrolytic solution. The process of fabricating a lithium ion secondary battery of the present invention is as follows. The negative electrode 4 and positive electrode 1 are formed in the same manner as in embodiment 1. And the adhesive agent is also prepared in the same manner as in embodiment 1. And then as shown in FIG. 5, the adhesive layer 8 is formed by coating the adhesive agent on both surfaces of the solid electrolyte 10 such as poly ethylene oxide diacrylate, poly ethylene oxide acrylate, poly ethylene glycol dimethylether, with $LiN(C_2F_5SO_2)_2$. Then the negative electrode 4 and positive electrode 1 are fixed to the adhesive layer 8 on the both surfaces of the solid electrolyte 10 respectively. The laminate thus prepared was then allowed to stand in a 60° C. drier while pressing for 2 hours to allow NMP to evaporate.

The lithium ion secondary battery prepared as above is compact and have a large battery capacity. And in this embodiment it is easy to mount the battery and especially it is effective for multi-layer structured battery. And it can be selected freely in ionically-conducting polymer compound independent to kinds of ion.

In the foregoing Embodiments 12 to 15, the number of laminates was varied. As a result, the battery capacity increased in proportion to the number of laminates.

Comparative Embodiment 1

The preparation procedure of Embodiment 1 was followed except that only the process for the preparation of the adhesive was changed. Thus, a lithium ion secondary battery was prepared.

(Preparation of Adhesive)

A mixture of 5.0 parts by weight of a polyvinylidene fluoride having an average molecular weight (Mw) of 534,000 (available from Aldrich Inc.) and 95 parts by weight of NMP was uniformly stirred to obtain an adhesive.

Comparative Embodiment 2

The preparation procedure of Embodiment 1 was followed except that only the process for the preparation of the adhesive was changed. Thus, a lithium ion secondary battery was prepared.

(Preparation of Adhesive)

A mixture of 5.0 parts by weight of a polyethylene glycol having an average molecular weight (Mw) of 10,000 (available from Aldrich Inc.) and 95 parts by weight of N-methylpyrrolidone was uniformly stirred to obtain an adhesive.

Comparative Embodiment 3

The preparation procedure of Embodiment 1 was followed except that only the process for the preparation of the adhesive was changed. Thus, a lithium ion secondary battery was prepared.

(Preparation of Adhesive)

A mixture of 5.0 parts by weight of a poly(methyl methacrylate) having an average molecular weight (Mw) of 350,000 (available from Aldrich Inc.) and 95 parts by weight of N-methylpyrrolidone was uniformly stirred to obtain an adhesive.

The lithium ion secondary batteries obtained in the foregoing Embodiments 1 to 11 and Comparative Examples 1 to 3 were then evaluated for properties. Table 1 shows the results of measurement of the adhesive strength (peel strength) of the positive electrode 1 and the negative electrode 4 with respect to the separator 7 and the electrical resistivity of the battery (cell).

TABLE 1

| Example No. | Peel strength (gf/cm) | | Cell electrical resistivity (Ω) |
|---|---|---|---|
| | Positive electrode/ separator | Negative electrode/ separator | |
| Embodiment 1 | 18 | 10 | 22 |
| Embodiment 2 | 15 | 13 | 23 |
| Embodiment 3 | 19 | 11 | 25 |
| Embodiment 4 | 23 | 33 | 31 |
| Embodiment 5 | 20 | 40 | 35 |
| Embodiment 6 | 26 | 19 | 20 |
| Embodiment 7 | 27 | 21 | 21 |
| Embodiment 8 | 26 | 35 | 21 |
| Embodiment 9 | 25 | 37 | 20 |
| Embodiment 10 | 25 | 36 | 22 |
| Embodiment 11 | 26 | 35 | 23 |
| Comp.Example1 | 31 | 33 | 150 |
| Comp.Example2 | 0 (immeasurable) | 0 (immeasurable) | 20 |
| Comp.Example3 | 0 (immeasurable) | 0 (immeasurable) | 20 |

As can be seen in Table 1, the lithium ion secondary batteries of Embodiments 1 to 11 exhibit a large ionic conductivity and desired adhesive strength at the same time. On the contrary, the battery of Comparative Example 1 exhibits the desired adhesive strength but doesn't exhibit a sufficient ionic conductivity. The batteries of Comparative Examples 2 and 3 exhibit a large ionic conductivity but don't exhibit a sufficient adhesive strength.

The difference between Embodiments 1 to 11 and Comparative Examples 1 to 3 is presumed attributed to the difference in the adhesive resin layer 8 made of the adhesive used for the bonding of the separator 7 to the positive electrode 1 and the negative electrode 4. In other words, the adhesives used in Embodiments 1 to 11 can provide an adhesive resin layer 8 which satisfies both the two requirements for ionic conductivity and adhesive strength.

As has been mentioned, the lithium ion secondary battery of the present invention comprises a positive electrode, a negative electrode, a separator retaining an electrolytic solution, and an adhesive resin layer which connects said positive electrode and negative electrode to said separator, characterized in that said adhesive resin layer provides both a large ionic conductivity and desired adhesive strength at the same time. In this arrangement, a practical thin type lithium ion secondary battery having excellent safety and charge-discharge efficiency (particularly large energy density) can be provided.

Further, In accordance with the present invention, the desired adhesive strength and a large ionic conductivity can be secured. In this arrangement, a compact excellent performance laminated electrode type battery having a large capacity can be provided without the necessity of a rigid casing even if used in the foregoing laminated form.

What is claimed is:

1. A lithium ion secondary battery comprising a positive electrode, a negative electrode, an electrolyte, and an adhesive resin layer which bonds each of said positive electrode and negative electrode to said electrolyte, wherein said adhesive resin layer comprises at least one compound selected from the group consisting of a poly(vinylidine fluoride) and a poly(vinyl alcohol) and contains an ionically-conducting polymer compound to secure a desired adhesive strength and ionic conduction between the positive electrode and the negative electrode; and said ionically conducting polymer compound comprises at least one compound selected from the group consisting of a poly(alkylester acrylate), a poly(alkylester methacrylate), a poly(hydroxyalkylester acrylate), a poly(hydroxyalcoxyester acrylate), a poly(hydroxyalkylester methacrylate) and a poly(hydroxyalcoxyester methacrylate).

2. The lithium ion secondary battery as claimed in claim 1, wherein an average molecular weight of said ionically-conducting polymer compound is in a range between 10000 and 1000000.

3. The lithium ion secondary battery as claimed in claim 1, wherein said adhesive resin layer contains 20~90 weight % of the ionically-conducting polymer compound.

4. The lithium ion secondary battery as claimed in claim 1, wherein said adhesive resin layer contains 40~80 weight % of the ionically-conducting polymer compound.

5. The lithium ion secondary battery as claimed in claim 1, wherein said electrolyte is constituted by a separator retaining an electrolytic solution.

6. The lithium ion secondary battery as claimed in claim 1, wherein said electrolyte is constituted by a solid electrolyte.

7. The lithium ion secondary battery as claimed in claim 6, wherein said ionically-conducting polymer compound is constituted by a material different from said solid electrolyte.

8. The lithium ion secondary battery as claimed in claim 1, wherein said ionically-conducting polymer compound comprises one or more ethylene oxide units in a molecular structure.

9. A method of fabricating a lithium ion secondary battery, comprising coating an adhesive resin layer on both surfaces of an electrolyte;

laminating a positive electrode and a negative electrode on the both surfaces of the electrolyte respectively to form a laminate; and forming the lithium ion secondary battery of claim 1.

10. A lithium ion secondary battery, comprising a plurality of electrode laminates having a positive electrode and a negative electrode bonded to an electrolyte through an adhesive resin layer containing a homogeneous solution of an ionically-conducting polymer compound and at least one compound selected from the group consisting of a polyvinylidene fluoride and a polyvinyl alcohol, wherein said ionically conducting polymer compound comprises at least one compound selected from the group consisting of a poly(alkylester acrylate), a poly(alkylester methacrylate), a poly(hydroxyalkylester acrylate), a poly(hydroxyalcoxyester acrylate), a poly(hydroxyalkylester methacrylate) and a poly(hydroxyalcoxyester methacrylate).

11. The lithium ion secondary battery as claimed in claim 10, wherein said plurality of electrode laminates are arranged so that said positive and negative electrodes are interposed alternately between cut plural electrolytes.

12. The lithium ion secondary battery as claimed in claim 10, wherein said plurality of electrode laminates are arranged so that said positive and negative electrodes are interposed alternately between wound plural electrolytes.

13. The lithium ion secondary battery as claimed in claim 10, wherein said plurality of electrode laminates are arranged so that said positive and negative electrodes are interposed alternately between folded plural electrolytes.

14. The lithium ion secondary battery as claimed in claim 10, wherein said ionically-conducting polymer compound comprises one or more ethylene oxide units in a molecular structure.

* * * * *